United States Patent [19]

Semich

[11] 3,797,157

[45] Mar. 19, 1974

[54] JIGGING ATTACHMENT FOR FISHING RODS

[76] Inventor: Joseph Semich, 2640 Parkwood Dr., Speedway, Ind. 46224

[22] Filed: Oct. 13, 1972

[21] Appl. No.: 297,271

[52] U.S. Cl.................................. 43/19.2, 43/25
[51] Int. Cl............................................ A01k 87/00
[58] Field of Search............... 43/25, 25.2, 19.2, 18, 43/24, 21.2

[56] References Cited
FOREIGN PATENTS OR APPLICATIONS

| 1,267,839 | 6/1961 | France | 43/25 |
| 1,464,777 | 11/1966 | France | 43/24 |

Primary Examiner—Warner H. Camp
Attorney, Agent, or Firm—Hood & Coffey

[57] ABSTRACT

A jigging attachment for a fishing rod equipped with a spinning reel consisting of a head formed with a longitudinal bore opening radially through a longitudinal slot, the head being resilient so that the rod may be snapped through the slot into and out of the bore where it may be frictionally gripped, and an integral stem substantially perpendicular to the head bore so that the stem may be adjustably positioned on the rod near the reel to extend at a selected angle away from the plane which is common to the rod and the spindle of the reel to divert the line during retrieval thereof onto the reel spindle.

6 Claims, 5 Drawing Figures

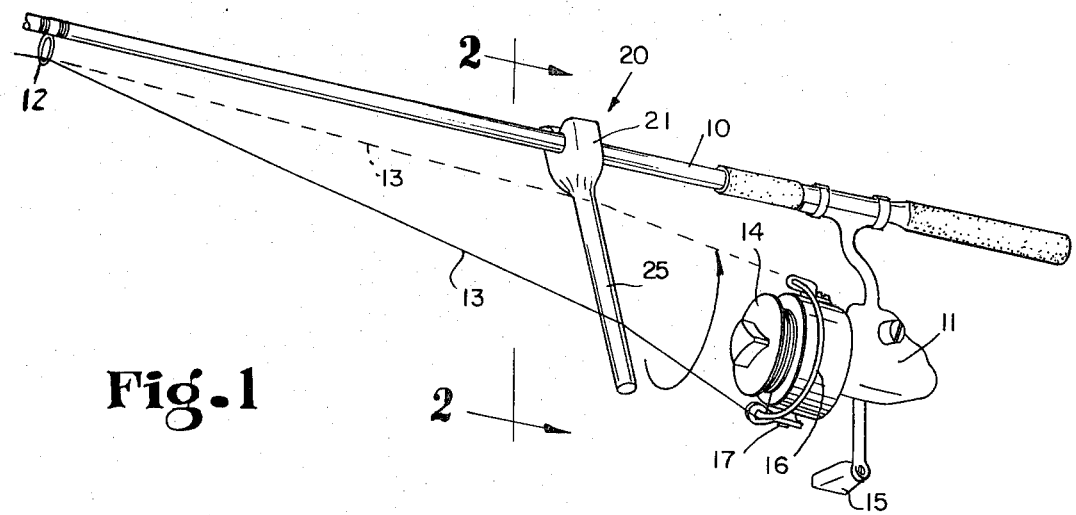
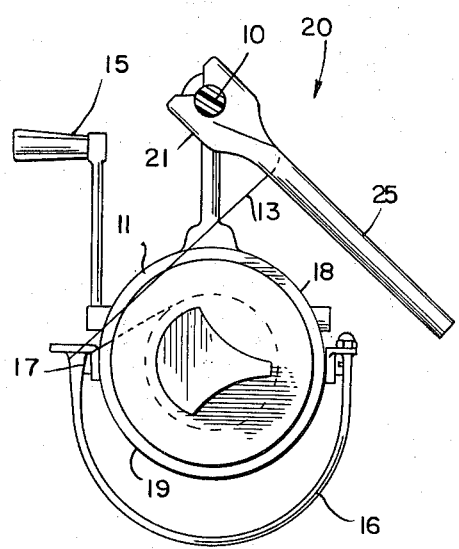
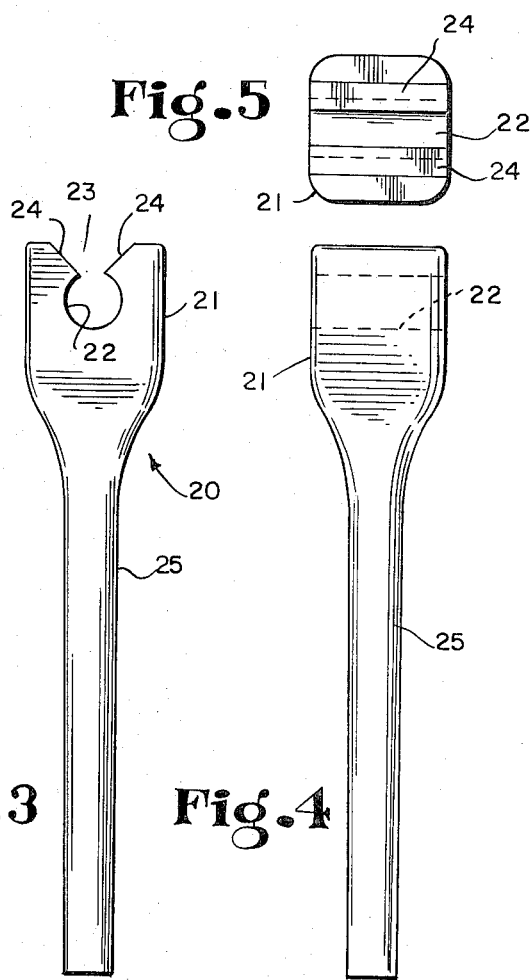

JIGGING ATTACHMENT FOR FISHING RODS

The present invention relates to a jigging attachment for fishing rods equipped with spinning reels and the primary object of the invention is to provide a device of extreme simplicity which may be attached to or removed from a rod without disjointing or unthreading the rod and which, when so attached, will be effective automatically to cause a jigging action upon a lure during retrieval of a line. A further object of the invention is to provide such a device which is readily adjustable, even during retrieval, to vary the degree and rate of such jigging action.

Still further objects of the invention will appear as the description proceeds.

To the accomplishment of the above and related objects, this invention may be embodied in the form illustrated in the accompanying drawings, attention being called to the fact, however, that the drawings are illustrative only, and that change may be made in the specific construction illustrated and described, so long as the scope of the appended claims is not violated.

In the drawings:

FIG. 1 is a fragmentary illustration of a fishing rod equipped with a line and a spinning reel and showing an embodiment of my attachment mounted on the rod in operative condition;

FIG. 2 is a section taken on the line 2—2 of FIG. 1;

FIG. 3 is an enlarged front elevation of an embodiment of my invention;

FIG. 4 is a side elevation thereof; and

FIG. 5 is a top end view thereof.

It is known that, if a guide member is interposed between a spinning reel and the nearest guide eye on an associated rod and is engaged with the line to divert that line laterally from the plane common to the rod and the reel spindle, the rate of linear movement of the incoming line will be increased as the reel flier moves away from the diverting device and will be reduced as the flier moves toward the diverting device, thus similarly affecting the rate of movement of the lure being retrieved. Various devices have been tried for accomplishing this purpose and many of them serve the function effectively; but so far as I am aware, such devices have been relatively complicated and expensive. I have provided an extremely simple device which may be readily snapped into place on a rod at a suitable point and there will be frictionally held in place in any selected position of angular adjustment relative to the plane common to the rod and the spindle of a spinning reel mounted thereon to produce the desired result.

Referring more particularly to the drawings, it will be seen that I have illustrated a tapered fishing rod 10 mounting a conventional spinning reel 11 at a suitable distance from the proximal guiding eye 12 conventionally found on such rods. A line 13 wrapped on the spindle 14 of the reel 11 has been threaded through the eye 12 and additional eyes (not shown) spaced along the length of the rod, to carry a lure (not shown).

As is well understood in the art, when line is to be paid out, the bail 16 of the reel 11 is turned 90° about its journal mountings 17 to extend generally forwardly from the reel, whereupon line may be readily drawn off the rotationally stationary spindle without affecting the rotary parts of the reel, as by a cast. When the lure is to be retrieved, the reel handle 15 will be rotated to drive the rotary body of the reel in a counterclockwise direction as viewed from the tip of the rod. As the reel body begins to move, the outstanding bail will engage the line 13 and will then be turned about its mountings 17 into its illustrated position, thus capturing the line which will slide along the length of the bail until it engages the trailing mounting 17 thereof. As the reel body continues to rotate, the line will be drawn, by the bail mounting, to be wrapped about the rotationally stationary, but axially reciprocating spindle 14.

Looking at FIG. 2, it will be apparent that, in the absence of a diverter such as the attachment indicated generally by the reference numeral 20, rotation of the bail would wrap line 13 onto reel spindle 14 at a rate directly proportional to the rate of rotation of the handle 15. However, with such a diverter in place, as the bail mounting 17 moves from about the point 18 in a counterclockwise direction, its lateral component of movement away from the diverter 20 will be added to the rate at which line is drawn toward the diverter; while, as the mounting 17 moves from about the point 19 to about the point 18, its lateral component of movement toward the diverter 20 will be subtracted from the rate at which line is retrieved. Thus, the lure at the distal end of the line will be jigged through the water at varying speeds.

The diverter of the present invention, indicated generally by the reference numeral 20, consists of a head 21 formed with a longitudinally extending bore 22 therethrough. The bore 22 opens radially through a longitudinally extending slot 23 the peripherally-spaced walls 24, 24 of which are flared as shown. The head is radially resiliently flexible so that, if a section of the rod 10 is pressed against the flared walls 24, the slot 23 will be widened sufficiently to permit the rod section to enter the bore 22, whereafter the head returns to its unflexed condition to grip the rod. If the selected rod section is not immediately frictionally gripped in the bore 22, the attachment 20 may be moved toward the proximal end of the tapered rod until it does encounter a rod section which will be frictionally gripped.

An elongated stem portion 25 is integral with the head 21, and the attachment will be adjusted about the axis of the rod 10 so that the stem 25 extends angularly away from the plane which is common to the rod 10 and the axis of the reel spindle 14. The degree of that angularity is, of course, readily adjustable even during retrieval operation of the reel 11; and it will be apparent that an increase in the angle between that common plane and the stem 25 will increase the jigging action on the lure and will increase the length of the sweeping movement of the line 13 along the stem 25 as the bail 16 rotates. FIG. 1 illustrates approximately the maximum sweep between the solid line position and the broken line position of the line 13.

In most instances, after a cast, the line will lie on the outer surface of the stem 25 as the handle 15 is manipulated to retrieve the lure; but if, in any particular instance, the line fails automatically to achieve that position, the angler may readily shift the line into proper position by manual manipulation. At any time, even during line retrieval, the attachment 20 may be turned to any desired degree about the axis of the rod 10, by simple finger pressure on the stem 25.

Reels are available for right-hand or left-hand manipulation. In the present drawings, I have shown a reel designed for right-hand manipulation and it will be seen that the stem 25 projects away from the above-mentioned common plane in a direction opposite from the reel handle. If a reel for left-hand manipulation is being used, the attachment 20 will be oppositely adjusted so that its stem 25 still will project away from the position of the handle.

It will be seen, thus, that the attachment of the present disclosure is extremely flexible in use in spite of its extreme structural simplicity.

The attachment will preferably be a molded plastic piece inherently possessing the desired resilient flexibility and the desired coefficient of friction to make it grip the rod firmly enough to retain any selected position, while being readily snapped into place or removed from the rod without the use of any tools whatever.

I claim as my invention:

1. A jigging attachment for a fishing rod equipped with a spinning reel including a flier, said attachment consisting of a head and a solid, straight stem of substantially uniform cross section throughout its length and integral with said head, said head being elongated in a direction generally perpendicular to the length of said stem and being formed with a longitudinal bore adapted frictionally to receive a portion of such a rod with said stem disposed outside the plane which is common to the axis of said rod and the axis of rotation of said flier.

2. The combination with a tapered fishing rod equipped with a spinning reel having a flier, of a jigging attachment consisting of a head having a longitudinal bore frictionally gripping a portion of said rod, a stem extending generally away from said rod when so gripped, and extending out of the plane which is common to said rod and the axis of said reel, and a line partially wound on said reel and extending along the rod past the distal tip thereof, said line being trained over said stem, whereby during line retrieval the length of line between said stem and the flier of said reel increases as said flier moves through approximately one-half of its path and decreases as said flier moves through the remainder of its path.

3. The combination of claim 2 in which said bore opens outwardly through a longitudinal slot whereby said rod may be radially entered into said bore.

4. The combination of claim 3 wherein the peripheral width of said slot is less than the diameter of said bore.

5. The combination of claim 4 wherein said head is radially resilient and the peripherally-spaced walls of said slot are outwardly flared to facilitate snapping said rod radially into and out of said bore.

6. The attachment of claim 1 in which said stem extends angularly out of the plane which is common to said rod and the axis of said reel, and a line partially wound on said reel and extending along said rod beyond the distal tip thereof, said line being trained over said stem, whereby during retrieval the length of line between said stem and the flier of said reel increases as said flier moves through approximately one-half of its path and decreases as said flier moves through the remainder of its path.

* * * * *